US012668126B2

(12) United States Patent
Kyle et al.

(10) Patent No.: US 12,668,126 B2
(45) Date of Patent: Jun. 30, 2026

(54) SMART VEHICLE STEERING SYSTEMS WITH CONTROL LOGIC FOR TOUCHSCREEN CONFIGURABLE STEERING WHEELS

(71) Applicant: GM GLOBAL TECHNOLOGY OPERATIONS LLC, Detroit, MI (US)

(72) Inventors: Trevor Kyle, Farmington Hill, MI (US); Matthew Bruce, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 19 days.

(21) Appl. No.: 18/792,895

(22) Filed: Aug. 2, 2024

(65) Prior Publication Data

US 2026/0034883 A1      Feb. 5, 2026

(51) Int. Cl.
| | |
|---|---|
| *B60K 35/22* | (2024.01) |
| *B60K 35/10* | (2024.01) |
| *B60K 35/50* | (2024.01) |
| *B60K 35/60* | (2024.01) |
| *B62D 1/04* | (2006.01) |

(52) U.S. Cl.
CPC .............. *B60K 35/22* (2024.01); *B60K 35/10* (2024.01); *B60K 35/50* (2024.01); *B60K 35/60* (2024.01); *B62D 1/046* (2013.01); *B60K 2360/1438* (2024.01); *B60K 2360/167* (2024.01); *B60K 2360/782* (2024.01)

(58) Field of Classification Search
CPC ...... B60K 2360/782; B60K 2360/1438; B60K 2360/167; B60K 2360/143; B60K 2360/1434; B60K 2360/1468; B60K 2360/1472; B60K 35/22; B60K 35/50; B60K 35/60; B60K 35/81; B60K 35/10; B60K 35/53; B62D 1/046
See application file for complete search history.

(56) References Cited

U.S. PATENT DOCUMENTS

| | | |
|---|---|---|
| 10,005,487 B2 | 6/2018 | Stebbins et al. |
| 10,489,993 B2 | 11/2019 | Dan et al. |

(Continued)

FOREIGN PATENT DOCUMENTS

| | | | | |
|---|---|---|---|---|
| DE | 102015200907 A1 * | 7/2016 | ......... | G06F 3/03547 |
| DE | 102021104330 A1 | 8/2022 | | |
| DE | 102021002596 A1 | 11/2022 | | |

*Primary Examiner* — Spencer D Patton
(74) *Attorney, Agent, or Firm* — Quinn IP Law

(57) ABSTRACT

A method of operating a vehicle includes a vehicle controller receiving a key-on command to turn on the vehicle. A touchscreen display interface mounted to a central hub of a steering wheel assembly of the vehicle's steering system displays a wheel angle indicator at a first location and a soft touch controls set at a second location. A position sensor generates sensor data indicative of a steering angle of a front vehicle wheel and/or a position of a user's hand on a handwheel of the steering wheel assembly. The touchscreen display interface displays: the wheel angle indicator moved to a new orientation responsive to the sensor data indicating the front vehicle wheel's steering angle is a non-zero angle, and/or the soft touch controls set moved to a new location responsive to the sensor data indicating the user's hand position moved to a new position on the steering wheel assembly's handwheel.

20 Claims, 4 Drawing Sheets

(56)        References Cited

U.S. PATENT DOCUMENTS

| | | | |
|---|---|---|---|
| 10,496,102 B2 | 12/2019 | Riefe et al. | |
| 2011/0241850 A1* | 10/2011 | Bosch | H03K 17/975 |
| | | | 74/552 |
| 2014/0062891 A1 | 3/2014 | Powell | |
| 2014/0277896 A1* | 9/2014 | Lathrop | B62D 1/04 |
| | | | 74/484 R |
| 2016/0103512 A1 | 4/2016 | Edgren | |
| 2018/0208212 A1 | 7/2018 | Suessenguth et al. | |
| 2020/0269920 A1 | 8/2020 | Millsap | |
| 2022/0297751 A1* | 9/2022 | Nakahara | B62D 6/002 |

* cited by examiner

SMART VEHICLE STEERING SYSTEMS WITH CONTROL LOGIC FOR TOUCHSCREEN CONFIGURABLE STEERING WHEELS

The present disclosure relates generally to steering systems for motor vehicles. More specifically, aspects of this disclosure relate to steering wheel assemblies with touchscreen display interfaces for steer-by-wire automobiles.

Current production motor vehicles, such as the modern-day automobile, are originally equipped with a steering system that enables a driver to maintain a desired course for the vehicle while controlling directional changes of the vehicle. Most vehicle steering systems utilize a hand-operated steering wheel that is manipulated by the driver to input a desired direction of travel for the vehicle. The steering wheel is mounted via a central hub to a steering column assembly that interconnects the steering wheel with the vehicle's road wheel steering mechanism, the most common of which is the rack-and-pinion steering assembly. In this architecture, a pinion gear at a bottom end of a steering shaft intermeshes with a linear gear bar, known as a "rack." When the steering wheel is rotated, the pinion gear spins with the rotating steering shaft, causing the rack to move rectilinearly along a transverse plane of the vehicle. A tie rod at each end of the rack is connected to the steering arm of a wheel spindle; the moving rack and tie rod pivot the spindle to thereby turn the road wheel. Driver input may be augmented with electric, hydraulic, or pneumatic Power Assisted Steering (also referred to as "PAS" or, more commonly, as "power steering") to introduce supplemental energy to the steering mechanism and thereby reduce driver effort.

Some contemporary vehicle steering systems eliminate any direct mechanical linkage between the steering wheel and the road wheels, such as removing the steering column and shaft couplings, and replace these linkages with electro-mechanical components and a human-machine interface (HMI) in what has become known as a "steer-by-wire" (SBW) system. One such steer-by-wire system employs a steering wheel position sensor that monitors the position, displacement, and turning rate of the steering wheel. A system controller translates these inputs into corresponding position, rate, and displacement values for turning of the vehicle's road wheels. A drivetrain control module or dedicated steering controller then outputs command signals to an electric motor that swivels the vehicle road wheels in response to the command signals. To convey a sense of "road feel" to the driver, the steer-by-wire system may incorporate tactile transducers, linear actuators, resistive brakes, and/or stepper motors which, controlled by the electronic steering controller, effects controllable feedback during operation of the vehicle.

SUMMARY

Presented below are vehicle steering systems with attendant control logic for provisioning touchscreen configurable steering wheels, methods for manufacturing and methods for operating such vehicle steering systems, and motor vehicles equipped with such steering systems. By way of non-limiting example, a steer-by-wire vehicle steering system employs a specially designed steering wheel assembly with a central hub that is layered with an interactive touchscreen display interface and is integrated with an outer handwheel ring with embedded sensors that detect real-time positions of the driver's hands. The touchscreen display interface may be interactive and customizable such that selectable quick-access "soft touch" buttons, dials, switches, etc. (collectively "soft touch controls"), may be added, removed, repositioned, and/or resized by the driver. During vehicle operation, the touchscreen-displayed buttons may be automatically repositioned and, optionally, reoriented to coincide with the detected locations of the driver's hands, e.g., in order to make the system more ergonomic. Upon startup, an SBW system control module may automatically orient images on the steering wheel's central touchscreen display such that the rotational position of the steering wheel appears to coincide with the current angle of the vehicle's front road wheels. During vehicle operation, the SBW system control module may automatically synchronize the steering wheel's perceived rotational position to match the road wheels' angle without actually rotating the steering wheel, e.g., to ensure a seamless experience for drivers and vehicle occupants.

Aspects of this disclosure are directed to memory-stored vehicle control protocols and vehicle control logic for provisioning touchscreen configurable steering wheels for SBW vehicle steering systems. In an example, a method is presented for operating a motor vehicle, which has a vehicle body, multiple road wheels attached to the vehicle body, and a vehicle steering system operable to steer a single or multiple front road wheels. A touchscreen display interface is mounted to a central hub of a steering wheel assembly of the vehicle steering system. This representative method includes, in any order and in any combination with any of the above and below disclosed options and features: receiving, e.g., from a body control module (BCM) via a resident or remote microcontroller, control module, programmable logic device, or network of controllers/modules/devices (collectively "controller"), a key-on command to turn on the motor vehicle; displaying, e.g., via the touchscreen display interface after receipt of the key-on command, a wheel angle indicator, which indicates a steering angle of the front road wheel(s), in a first orientation at a first location and a set of soft touch controls, which contains soft touch input controls for operating various vehicle subsystems, in a second orientation at a second location; generating, e.g., via an on-vehicle position sensor of the motor vehicle, sensor data indicative of a real-time steering angle of the front vehicle wheel and/or a real-time hand position of a user's hand on a handwheel of the steering wheel assembly; and displaying, e.g., via the touchscreen display, the wheel angle indicator moved to a new orientation responsive to the sensor data indicating the real-time steering angle of the front vehicle wheel(s) is a non-zero value and/or the soft touch controls set moved to a new location responsive to the sensor data indicating the user's real-time hand position moved to a new position on the steering wheel assembly's handwheel.

Aspects of this disclosure are also directed to smart vehicle steering systems with attendant control logic for provisioning touchscreen configurable steering wheels. In an example, a vehicle steering system is presented for a motor vehicle, such as a drive-by-wire (DBW) automobile. The vehicle steering system includes a steering wheel assembly that is rotatably attached to the vehicle's body and operable to steer a front vehicle wheel of the vehicle's road wheels. The steering wheel assembly includes a central hub with a handwheel attached to the central hub. One or more hand position sensors are attached to the handwheel and operable to detect a user's hand on the handwheel. Integrated into the steering wheel assembly is a touchscreen display interface that is mounted onto the central hub. The steering wheel assembly includes a system controller that is programmed to receive an indication of a key-on command to turn on the motor vehicle; after receipt of the key-on command, the controller commands the touchscreen display interface to display both a wheel angle indicator at one location and a set of soft touch controls at another location. The system controller communicates with a wheel angle sensor to receive therefrom angle sensor data indicative of a real-time steering angle of one or both front vehicle wheels. The controller also communicates with the hand position sensor(s) to receive therefrom position sensor data indicative of real-time hand positions of the user's hands on the handwheel. The controller concurrently commands the touchscreen display interface to display: the wheel angle indicator moved to a new orientation responsive to the angle sensor data indicating the steering angle of the front vehicle wheel(s) is a non-zero angle value, and the soft touch controls set moved to a new location responsive to the position sensor data indicating the hand positions of the user's hands moved to new hand positions on the handwheel of the steering wheel assembly.

Additional aspects of this disclosure are directed to motor vehicles equipped with smart vehicle steering systems with actively adaptable touchscreen steering wheels. As used herein, the terms "vehicle" and "motor vehicle" may be used interchangeably and synonymously to include any relevant vehicle platform, such as passenger vehicles, commercial vehicles, industrial vehicles, off-road and all-terrain vehicles (ATV), motorcycles, farm equipment, aircraft, spacecraft, watercraft, etc. In an example, a motor vehicle includes a vehicle body with a passenger compartment, multiple road wheels attached to the vehicle body (e.g., via corner modules coupled to a unibody or body-on-frame chassis), and other standard original equipment. A prime mover, which may be in the nature of an electric traction motor and/or an internal combustion engine (ICE) assembly, is located inside the vehicle body and drives the road wheel(s) to propel the vehicle. Also attached to the vehicle body is a vehicle steering system that is operable to turn one or more of the vehicle's front wheels to thereby steer the vehicle. The vehicle steering system includes a steering wheel assembly with a handwheel that is attached to a central hub. The handwheel and central hub may be rotatably attached to the vehicle body by a steering column assembly; alternatively, the central hub may be rigidly attached to the vehicle body and the handwheel may be rotatably attached to the vehicle body, e.g., by a wheel torque and angle unit.

Continuing with the discussion of the foregoing example, the vehicle is also equipped with a resident or remote vehicle controller that is programmed to receive, e.g., from an on-vehicle BCM, confirmation of a key-on command to turn on the motor vehicle. After the vehicle is turned on, the controller commands a touchscreen display interface mounted to the central hub to display: (1) a wheel angle indicator positioned at a first location in a first orientation, and (2) a set of soft touch controls positioned at a second location in a second orientation. The controller then communicates with one or more on-vehicle sensor devices to receive sensor data indicative of: (1) a real-time steering angle of one or more front vehicle wheels, and/or (2) a real-time hand position of one or more of a user's hands on the handwheel of the steering wheel assembly. The controller then commands the touchscreen display interface to display: (1) the wheel angle indicator moved to a new orientation and/or location responsive to the sensor data indicating the vehicle wheel steering angle is a non-zero value, and/or (2) the soft touch controls set moved to a new location and/or orientation responsive to the sensor data indicating the user's hand position moved to a new hand position on the handwheel.

For any of the disclosed vehicles, systems, and methods, the on-vehicle position sensor may include multiple in-cabin pressure sensors, and the received sensor data may indicate a first pressure sensor detects the user's hand position at a first handwheel angle (e.g., left hand −60 degrees (°) from top center) and a second pressure sensor subsequently detects the user's new hand position at a second handwheel angle (e.g., left hand −130° from top center). It is envisioned that the smart vehicle steering system may actively monitor one or both of the user's hands to automate the repositioning of one or more soft touch controls sets. In this instance, the original location of the soft touch controls may be radially aligned with the first handwheel angle and the new location may be radially aligned with the second handwheel angle. It may be desirable that the in-cabin pressure sensors take on the form of a networked array of pressure sensors mounted to and spaced equidistant around the handwheel. The pressure sensors may take on any suitable form factor, including piezoresistive pressure sensors, capacitive pressure sensors, diffused silicon pressure sensors, piezoelectric pressure sensors, and/or inductive pressure sensors.

For any of the disclosed vehicles, systems, and methods, the touchscreen display interface may display the set of soft touch controls rotating to a new location and a new orientation responsive to sensor data indicating the user's real-time hand position moved to the new location on the handwheel. The user may be given the option to disable the system-automated repositioning/reorienting of the wheel angle indicator and/or soft touch controls. As a further option, the touchscreen display interface may receive one or more selections from the user to add, remove, reposition, and/or resize one or more of the soft touch controls in a set of soft touch controls. In response, the touchscreen display interface may modify the soft touch controls set in accordance with the user selection received from the user. The user may be given the option to reposition, reorient, and/or reorder a set of soft touch controls.

For any of the disclosed vehicles, systems, and methods, the on-vehicle position sensor may include one or more wheel angle sensors, each of which is operatively attached to and monitors swiveling rotation of a respective front vehicle wheel. In this instance, the received sensor data may indicate a front vehicle wheel's real-time steering angle is a non-zero angle relative to a longitudinal forward-driving reference plane of the motor vehicle (e.g., front-left corner wheel assembly rotated +26° from fore-aft reference plane extending through upper swivel mount of steering knuckle vertical arm). As a further option, the wheel angle indicator may be rotated the sensor-measured non-zero angle value of the front vehicle wheel relative to a longitudinal zero-angle reference line of the steering wheel assembly (e.g., directional indicator rotated +26° from top center of touchscreen). In another example, a rotational encoder may be attached to the steering wheel assembly (e.g., mounted to a bottom end of a steering shaft). The encoder may actively measure a real-time displacement and turning rate of the handwheel during operation of the motor vehicle. In this instance, the touchscreen display interface may display the wheel angle indicator rotating coincident with the real-time displacement and turning rate of the handwheel.

For any of the disclosed vehicles, systems, and methods, the vehicle controller may receive, e.g., from the in-vehicle BCM, confirmation of a wakeup command to wake up the motor vehicle prior to turning on the vehicle. In this instance, the touchscreen display interface may automatically respond to the wakeup command by displaying the wheel angle indicator in a default orientation at a default location. Optionally, the wheel angle indicator may include a vehicle emblem and/or vehicle name that corresponds to the subject motor vehicle's make and/or model. Moreover, the wheel angle indicator's default location may be at the center of the touchscreen display interface, and the default orientation may be substantially horizontal. As another option, a lighting element (e.g., color-changing fabric or internally packaged LED array) may be mounted to the steering wheel's handwheel. In this instance, the lighting element may display a handwheel steering reference point indicative of a current steering direction of the steering wheel assembly.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
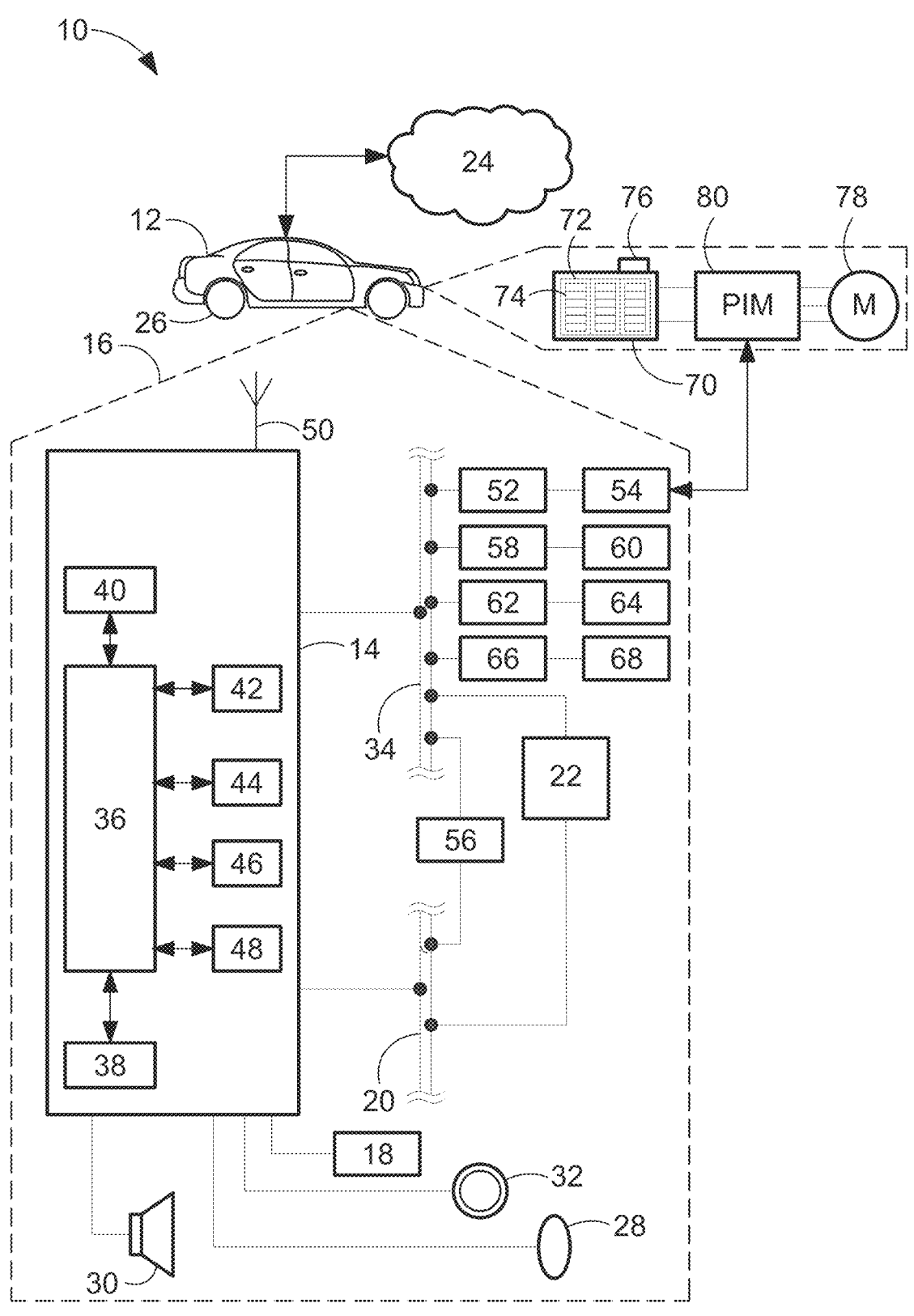
FIG. 1 is a partially schematic, side-view illustration of a representative motor vehicle with a steer-by-wire (SBW) vehicle steering system and a network of on-vehicle controllers, sensing devices, and communication devices for provisioning a touchscreen configurable steering wheel in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, execution of the present concepts for the illustrated vehicle steering system should be appreciated as a non-limiting implementation of disclosed features. As such, it will be understood that aspects and features of this disclosure may be integrated into assorted steering wheel assembly designs, implemented by other vehicle steering system architectures, and incorporated into any logically relevant type of motor vehicle. Moreover, only select components of the motor vehicle and vehicle steering system are shown and described in detail herein. Nevertheless, the vehicles and systems discussed below may include numerous additional and alternative features, and other available peripheral hardware, for carrying out the various methods and functions of this disclosure.

The representative vehicle 10 of FIG. 1 is originally equipped with a vehicle telecommunications and information ("telematics") unit 14 that wirelessly communicates, e.g., via cellular network, satellite service, wireless-enabled modem, etc., with a remotely located cloud computing host service 24 (e.g., ONSTAR®). Some of the other vehicle hardware components 16 shown generally in FIG. 1 include, as non-limiting examples, an electronic video display device 18, a microphone 28, audio speaker(s) 30, and assorted user input controls 32 (e.g., buttons, knobs, pedals, switches, touchpads, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal commands; the vehicle 10 may be equipped with an embedded voice-processing unit utilizing audio filtering, editing, and analysis modules. Conversely, the speaker 30 provides audible output to a vehicle occupant and may be either a stand-alone speaker dedicated for the telematics unit 14 or may be part of an audio system 22. The audio system 22 is connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Cloud (V2C), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The vehicle speed sensor(s) 66 may be in the nature of a mechanical or electromagnetic transmission shaft sensor or electronic wheel speed sensor for detecting vehicle speed. The vehicle dynamics sensor(s) 68 may be in the nature of a single-axis or a triple-axis accelerometer, an angular rate sensor, an inclinometer, steering wheel angle sensor, brake sensor, etc., for detecting longitudinal and lateral acceleration, yaw, roll, and/or pitch rates, steering angle, and other dynamics related parameters. The type, placement, number, and interoperability of the distributed array of in-vehicle sensors may be adapted, singly or collectively, to a given vehicle platform for achieving a desired level of automated vehicle operation.

To propel the motor vehicle 10, an electrified powertrain is operable to generate and deliver tractive torque to one or more of the vehicle's drive wheels 26. The powertrain is represented in FIG. 1 by a rechargeable energy storage system (RESS), which may be in the nature of a chassis-mounted traction battery pack 70, that is operatively connected to an electric traction motor (M) 78. The traction battery pack 70 is generally composed of one or more battery modules 72 each containing a cluster of battery cells 74, such as lithium-class, zinc-class, nickel-class, or organo-silicon-class cells of the pouch, can, or cylindrical type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables on-module management, cell sensing, etc.

Discussed below are smart vehicle steering systems that utilize embedded hand position sensors and a touchscreen display interface that are integrated into a symmetric or asymmetric steering wheel assembly to enable user configurability of soft-touch controls, dynamic button-to-hand position tracking, and instantaneous handwheel-to-road wheel synchronization. The touchscreen display interface may take on an assortment of different form factors, including a high-definition capacitive or resistive touchscreen display unit or a touch-sensitive electronic ink (E-Ink) display unit. The outer handwheel ring of the steering wheel assembly may incorporate an annular trackpad, a circumferentially spaced array of pressure sensors, or other position sensing device that tracks real-time hand positions of a driver's hands on the handwheel. Unlike conventional steering wheel assemblies, the handwheel may be unencumbered by hard end stops and, thus, may be free to spin infinitely. For autonomous vehicle applications, the touchscreen display interface, alone or in conjunction with the handwheel, may be modulated in real-time during vehicle operation to emulate movement of the steering wheel assembly to steer the vehicle.

When the vehicle is asleep (e.g., vehicle powertrain off and vehicle electronics off or in low-power mode), the vehicle steering system may enable an occupant to move the handwheel to any desired position. Responsive to a wake-up event (e.g., occupant activates accessory mode), a steer-by-wire control module (SWCM) may read the steering wheel's absolute position sensor and display a vehicle logo, quick-access buttons, and other desired information in a horizontally-aligned perspective. Responsive to a vehicle key-on event (e.g., driver depresses ignition button), the SWCM synchronizes the graphics of the steering wheel's touchscreen display with the current angle of the road wheels. For instance, the SWCM may read the front road wheels' wheel angle sensors and immediately modify the features displayed on the steering wheel touchscreen to match the road wheel angle. At the same time, the SWCM may learn a new angular offset that correlates the handwheel's current position sensor value to the touchscreen's currently displayed angle; the SWCM may retain that offset for the rest of the key cycle (e.g., resets responsive to key-off event). It may be desirable that the steering wheel does not physically move during this alignment process; once complete, the driver is then free to drive the vehicle.

During steering system operation, memory-stored application software may comprehend position sensor/encoder overflows and underflows to ensure that the handwheel may be initialized at any encoder value. With the vehicle parked, the driver may be presented with one or more options to customize the location, size, layout, orientation, color, existence, etc., of quick-access soft touch controls on the steering wheel, e.g., reducing or eliminating traditional electromechanical "hard" buttons from the assembly. If desired, steering wheel customization options may be accessed through the steering wheel's touchscreen interface and, optionally, through the centerstack telematics unit. The driver may also be prompted to enable or disable automated alignment of the touchscreen's soft touch controls with the driver's hands as they move to different positions along the handwheel. Since each driver may have different preferences for their resting hand locations, this feature provides the driver with easy access to their soft touch controls regardless of hand location. Upon turning the vehicle off (e.g., at a key-off event), the steering wheel integrated touchscreen interface may default to displaying the vehicle logo/name and other desired information in a horizontally-aligned fashion. For E-Ink configurations, this information may remain present even if the vehicle is asleep.

Attendant benefits for at least some of the disclosed concepts include an infinitely configurable steering wheel assembly that allows for a universal assembly construct to be implemented across multiple vehicle platforms with a concomitant reduction in design time, cost, and complexity. For SBW applications, the handwheel and hub-mounted touchscreen interface may be immediately synchronized with the present driving direction of the vehicle and vehicle road wheels before driving commences. This feature also enables the smart vehicle steering system to emulate traditional mechanical driving systems in a SBW vehicle. For circularly symmetric steering wheel designs, the steering system may not need to sync the handwheel but rather may automatically assign its current angular position to be equal to the road wheel angle. By allowing customization of the steering wheel touchscreen interface, the driver may be enabled to access more of their desired functions while also hiding any underused functions. Since different drivers hold the wheel in different locations, automatically moving the buttons to match the location of the driver's hands would enhance usability and convenience.

Figures 2A, 2B, 2C:
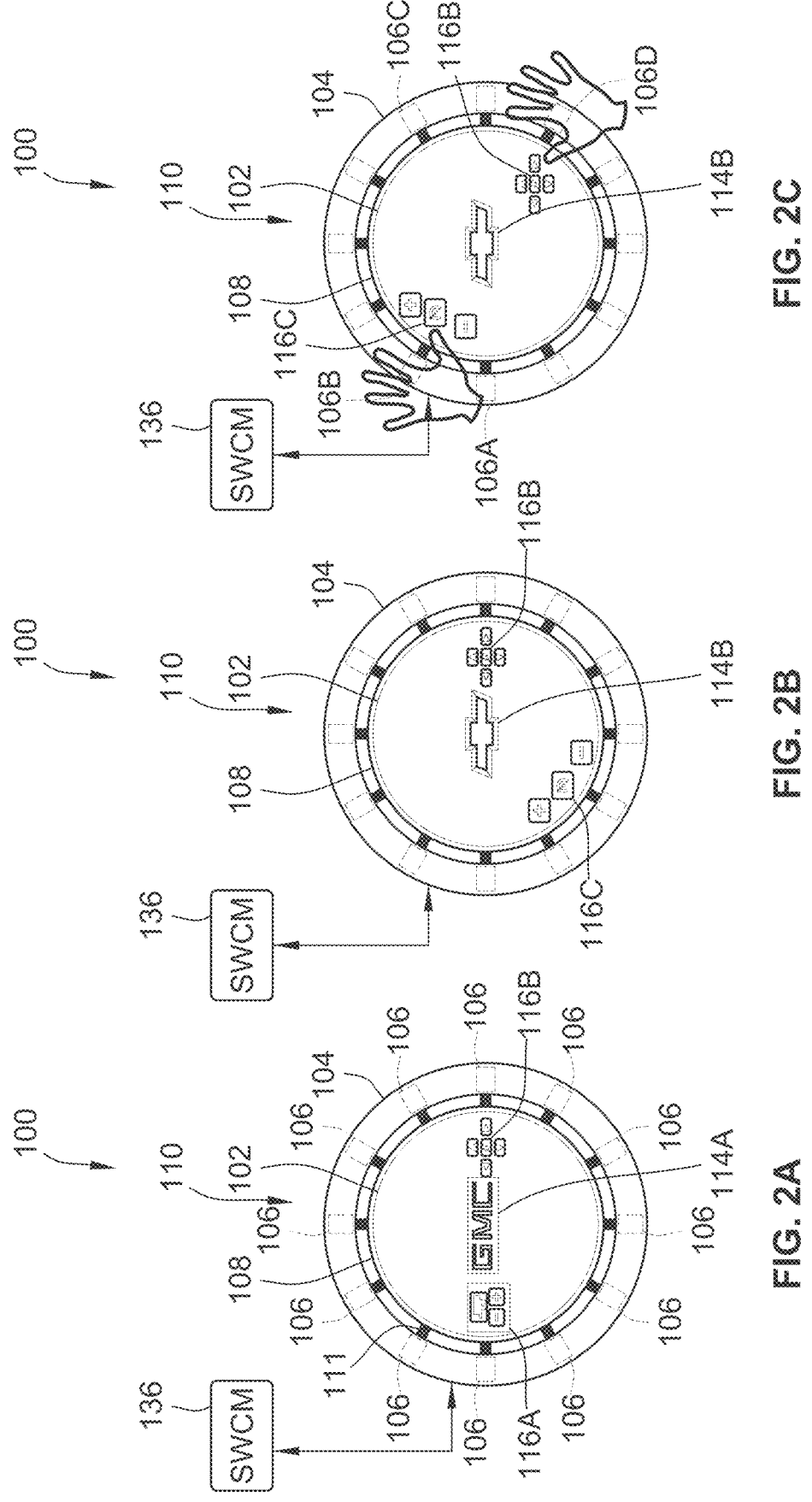
FIGS. 2A-2C are plan-view illustrations of a representative vehicle steering wheel assembly with an integrated touchscreen display interface and handwheel-embedded hand position sensors for automated button-to-hand alignment in accordance with aspects of the present disclosure.

FIGS. 2A-2C present a representative smart vehicle steering system 100 that includes a manually operated vehicle steering wheel assembly 110 with an integrated touchscreen display interface 102 and an outer handwheel ring 104 (or "handwheel" for short) that is embedded with hand position sensors 106 for automated alignment of soft touch controls to driver hand positions. In accord with the illustrated example, the touchscreen display interface 102 is recessed into, mounted on top of, or otherwise securely attached to a central hub 108 of the steering wheel assembly 110. The outer handwheel ring 104 may be rigidly mounted, e.g., via radially elongated hub spokes 111, to the central hub 108 such that the handwheel 104 circumscribes and rotates in unison with the hub 108 and touchscreen 102. The central hub 108 and, thus, the touchscreen display interface 102 and sensor-embedded handwheel 104 may be rotatably mounted, e.g., via an adjustable steering column assembly (e.g., steering shaft 112 of FIG. 3A), to a body of a vehicle (e.g., vehicle body 12 of automobile 10 of FIG. 1). It is envisioned that the steering wheel assembly 110 may take on assorted combinations of shapes, sizes, and designs within the intended scope of this disclosure.

The hand position sensors 106 of FIGS. 2A-2C may take on an assortment of different arrangements and form factors, including a networked array of circumferentially spaced pressure sensors. As shown, the pressure sensors are mounted inside of and spaced equidistant around the handwheel (e.g., approximately 30° apart from each other). While shown with a total of twelve (12) sensors 106, the steering wheel assembly 110 may incorporate greater or fewer sensors—including a single continuous contact sensor—within the intended scope of this disclosure. Moreover, the sensors 106 may include any suitable type of contact pressure sensor, such as piezoresistive pressure sensors, capacitive pressure sensors, diffused silicon pressure sensors, piezoelectric pressure sensors, ceramic pressure sensors, micro-electromechanical system (MEMS) pressure sensor, and inductive pressure sensors, as some non-limiting examples. Alternative embodiments may altogether omit the embedded positions sensors and instead employ, for example, a vision-based position sensing system to track real-time movement and positioning of a user's hands on the handwheel 104.

With continuing reference to FIGS. 2A-2C, the vehicle steering wheel assembly 110 may actively monitor movement of a user's hand or hands on the handwheel 104 and, optionally, on the touchscreen display interface 102. As shown in FIG. 2C, a first (9-o-clock) pressure sensor 106A initially detects the left hand of the user positioned on the handwheel 104 at a first handwheel angle (e.g., ~270°/−90° from top center). A second (10-o-clock) pressure sensor 106B subsequently detects the user's left hand move to a new position at a second handwheel angle (e.g., ~300°/−60° from top center). In the same vein, a third (2-o-clock) pressure sensor 106C initially detects the user's right hand positioned on the handwheel 104 at a third handwheel angle (e.g., ~60° from top center), and a fourth (4-o-clock) pressure sensor 106D subsequently detects the user's right hand move to a new position at a fourth handwheel angle (e.g., ~120° from top center).

Touchscreen display interface 102 provisions an interactive graphical user interface (GUI) with subsystem control features and vehicle dynamics feedback for a driver or other vehicle occupant (collectively "user") to govern operation of select aspects of a vehicle, such as automobile 10 of FIG. 1. By way of example, the touchscreen display interface 102 displays a wheel angle indicator 114A or 114B that specifies a steering angle of the vehicle's front road wheel(s) and, thus, an intended/current direction of travel of the vehicle. At the same time, the touchscreen display interface 102 displays one or more sets of soft touch controls 116A, 116B and/or 116C that each contains soft touch buttons, dials, switches, etc., for operating various vehicle subsystems. The first wheel indicator 114A is shown as a vehicle emblem that is indicative of the manufacturer ("make") of the vehicle, whereas the second wheel angle indicator 114B is shown as a vehicle name of the vehicle manufacturer. By comparing FIG. 2A to FIG. 2B, a user may have selected to switch the displayed directional indicator on the touchscreen display interface 102 from the first wheel angle indicator 114A to the second the wheel angle indicator 114B.

Continuing with the foregoing discussion, the first set of soft touch controls 116A may include a set of soft touch buttons for enabling, disabling, and controlling a TOW/HAUL MODE for the vehicle's powertrain system. In contrast, the second set of soft touch controls 116B may include a set of soft touch buttons for enabling, disabling, and controlling an ACTIVE CRUISE CONTROL MODE for the vehicle's advanced driver's assistance system (ADAS). The third set of soft touch controls 116C, on the other hand, may include a set of soft touch buttons for operating the vehicle's in-cabin audio system. By comparing FIG. 2A to FIG. 2B, a user may have selected to remove the first set of soft touch controls 116A from the touchscreen display interface 102, add the third set of soft touch controls 116C, and reposition the third set of soft touch controls 116C to a desired new location.

FIG. 2B shows the touchscreen display interface 102 positioning the wheel angle indicator 114B at a first location (e.g., radial center of display) and in a first orientation (e.g., substantially horizontal). In contrast, the touchscreen display interface 102 displays the second set of soft touch controls 116B positioned at a second location (e.g., at 3-o-clock or approximately 90° from top center) and in a second orientation (e.g., substantially horizontal). Comparatively, the third set of soft touch controls 116C is displayed at a third location (e.g., at 7-o-clock or approximately 210°/−150° from top center) and in a third orientation (e.g., approximately 150° from horizontal). It should be appreciated that touchscreen display interface 102 may present a variety of different types, arrangements, and numbers of wheel angle indicators and soft touch controls from that which are shown in the Figures.

During operation of the steering wheel assembly 110, a system controller (e.g., SWCM 136 of FIGS. 2A-2C in cooperation with vehicle CPU 36 of FIG. 1) reads the hand position sensors 106 to detect real-time or near-real-time movement of a user's hand or hands from an initial (first) location(s) to a new (second) location on the handwheel 104. In accord with the above-described example, pressure sensor 106B (FIG. 2C) detects the user's left hand moving to a new hand position at 10-o-clock or approximately ~300°/−60° from top center of the handwheel 104; SWCM 136 responsively relocates the third set of soft touch controls 116C to a new controls position at 10-o-clock or approximately ~300°/−60° from top center of the touchscreen 102 to be radially aligned with the user's left hand on the handwheel 104. At the same time, the touchscreen display interface 102 may rotate the soft touch controls set 116C to a new orientation (e.g., approximately 85° from horizontal) responsive to received hand position sensor data indicating the user's left hand moved to the new hand position. In addition, pressure sensor 106D (FIG. 2C) detects the user's right hand moving to a new hand position at 4-o-clock or approximately ~120° from top center of the handwheel 104; SWCM 136 responsively relocates the second soft touch controls set 116B to a new controls position at 4-o-clock or approximately ~120° from top center of the touchscreen 102 to be radially aligned with the user's right hand.

Figures 3A, 3B, 3C:
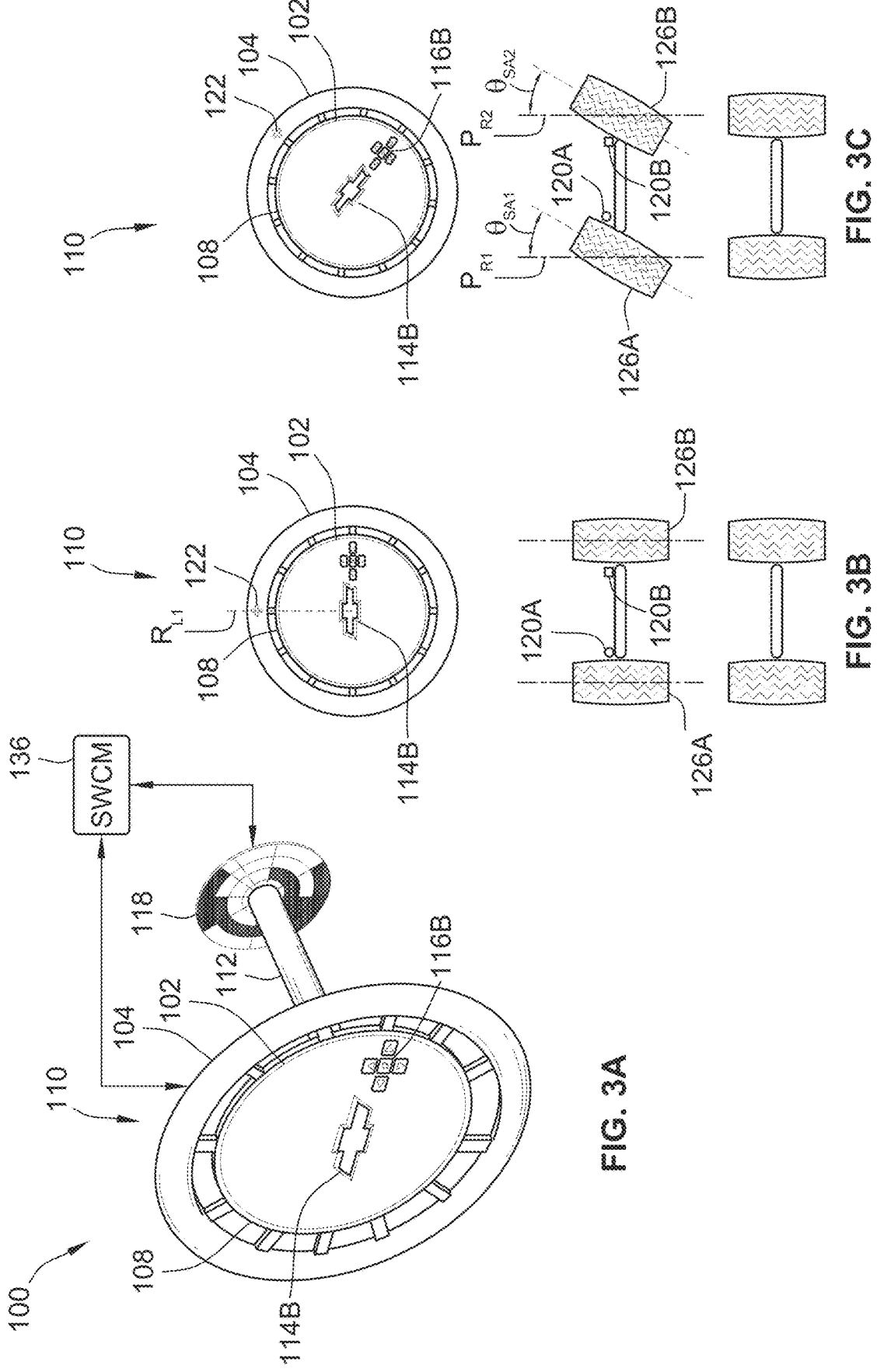
FIGS. 3A-3C are perspective and plan-view illustrations of a representative vehicle steering wheel assembly with an integrated touchscreen display interface and a steering shaft-mounted position encoder for automated steering wheel-to-road wheel alignment in accordance with aspects of the present disclosure.

FIGS. 3A-3C portray the representative smart vehicle steering system 100 of FIGS. 2A-2C with an integrated rotational position encoder 118 that is mounted onto a distal end of a steering shaft 112 for automated steering wheel-to-road wheel alignment. The rotational position encoder 118 may take on a variety of suitable shaft-rotation sensing devices, including rotary angle encoders, electromechanical rotary position sensors, rotary potentiometer, etc. Upon vehicle wakeup/startup, the SWCM 136 of FIG. 3A may read an absolute position value of the handwheel 104 from the rotational position encoder 118. At the same time, the touchscreen display interface 102 may display the wheel angle indicator 114B and the soft touch controls set 116B in respective default locations and orientations. FIG. 2A portrays the wheel angle indicator 114B default to the center of the touchscreen display interface 102 with a horizontally-aligned orientation, and the soft touch controls 116B default to the perimeter of the touchscreen 102 at 3-o-clock/90° from center of touchscreen 102 with a horizontally-aligned orientation.

With reference to FIGS. 3A and 3B, a pair of left (first) and right (second) wheel angle sensors 120A and 120B are operatively attached to left (first) and right (second) front vehicle wheels 126A and 126B, respectively (e.g., mounted to a top strut mounting joint of a vertical arm of a steering knuckle). During vehicle operation, each wheel angle sensor 120A, 120B actively monitors rotational motion of its respective road wheel 126A, 126B and outputs sensor data indicative of a real-time or near-real-time steering angle $\theta_{SA1}$ or $\theta_{SA2}$ of that front wheel 126A, 126B. In accord with the illustrated example, the steering angle $\theta_{SA1}$ or $\theta_{SA2}$ may be derived as a negative or positive non-zero angle value relative to a longitudinal forward-driving reference plane $P_{R1}$ or $P_{R2}$ of each vehicle road wheel. It is also envisioned that road wheel angle values may be derived from a single wheel angle sensor, a linear transducer on the steering rack or, for SBW applications, feedback from a pinion angle sensor attached to an on-rack steering motor.

To emulate positioning and movement of the steering wheel assembly 110 relative to the front road wheels 126A, 126B, the SWCM 136 may actively coordinate with the wheel angle sensors 120A, 120B and touchscreen display interface 102 to rotate the wheel angle indicator 114B in unison with the wheels 126A, 126B to match the measured steering angle values $\theta_{SA1}$, $\theta_{SA2}$ of the vehicle wheels. By comparing FIG. 3B to FIG. 3C, for example, it can be seen that the front wheels 126A, 126B rotate clockwise from an initial (first) steering angle of about 0° (FIG. 3B) relative to the forward-driving reference plane $P_{R1}$, $P_{R2}$ to a new (second) steering angle $\theta_{SA1}$, $\theta_{SA2}$ of about 30° (FIG. 3C). In tandem, the touchscreen display interface 102 is rotates the wheel angle indicator 114B from an initial (first) indicator orientation of about 0° (FIG. 3B) relative to a longitudinal zero-angle reference line $R_{Z1}$ of the steering wheel assembly 110 to the new (second) indicator orientation of about 30° (FIG. 3C). Once the handwheel 104/encoder 118 and touchscreen 102/indicator 114B are synchronized with the front road wheels 126A, 126B, e.g., during a wakeup or key-on event of the vehicle, user driver may be enabled to drive the vehicle.

During dynamic vehicle operation, the SWCM 136 may read the rotational encoder 118 and the wheel angle sensors 120A, 120B to track real-time movement of the front road wheels 126A, 126B and actively rotate the wheel angle indicator 114B to reflect these directional changes. Encoder data output by the rotational encoder 118 may contain values that reflect real-time displacement and turning rates of the handwheel 104 during operation of the motor vehicle. The touchscreen display interface 102 may concurrently rotate the wheel angle indicator 114B coincident with the real-time displacement and turning rate of the handwheel 104 and, thus, the angular displacement of the vehicle road wheels 126A, 126B. An optional lighting element 122, such as a color-changing fabric or an internally packaged light-emitting diode (LED) array, may be mounted onto the handwheel 104 of the steering wheel assembly 110. This lighting element 122 generates a visual cue (e.g., a red-colored cruciform) that indicates the current steering direction of the steering wheel assembly 110.

Figure 4:
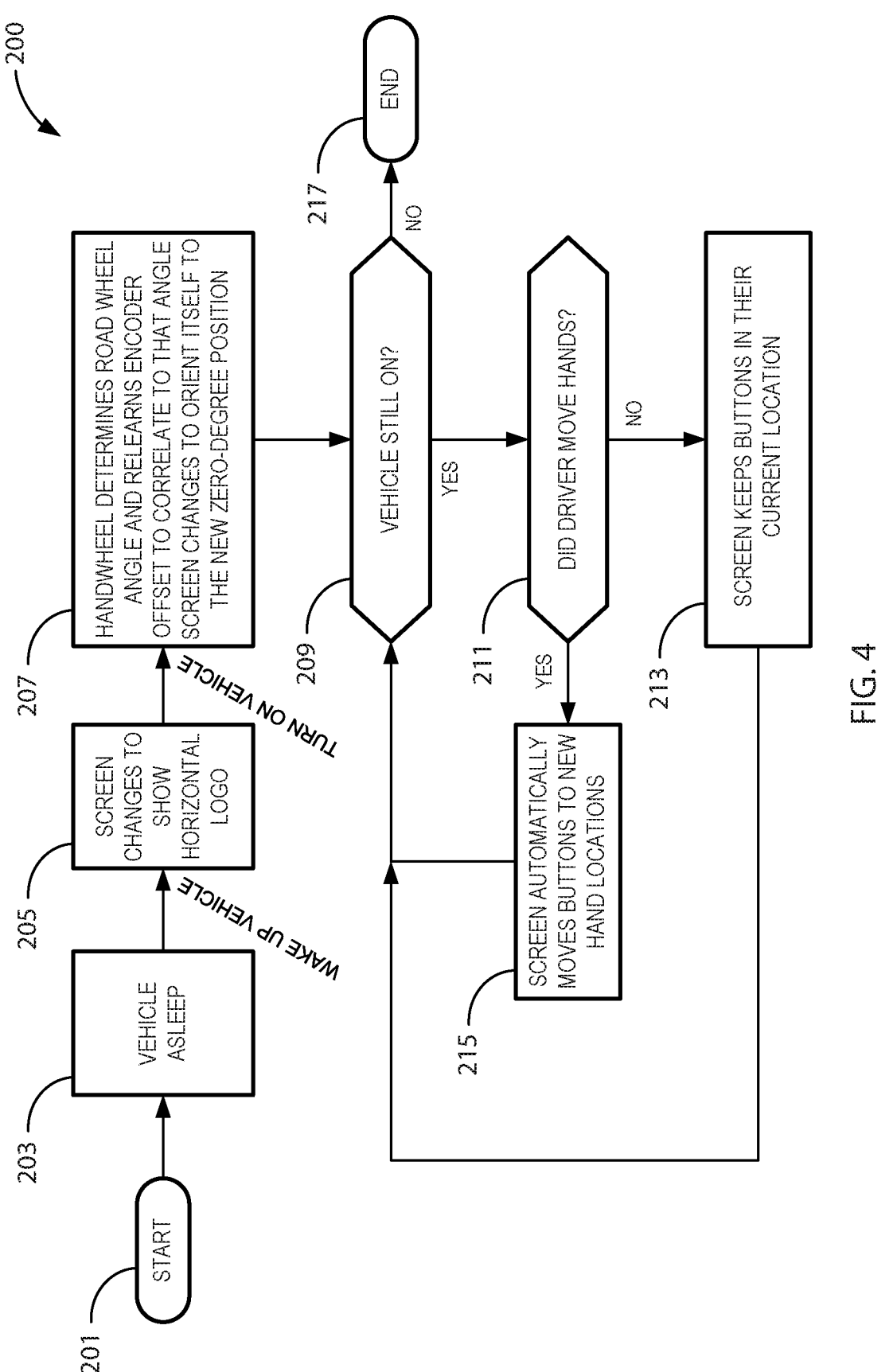
FIG. 4 is a flowchart illustrating a representative vehicle steering system control protocol for touchscreen configurable steering wheel operation, which may correspond to memory-stored instructions that are executable by a resident or remote microcontroller, control module, logic circuit, or other integrated circuit (IC) device or network of circuits/modules/microcontrollers/IC devices (collectively "controller") in accordance with aspects of the disclosed concepts.

With reference next to the flowchart of FIG. 4, an improved method or control protocol for operating a vehicle steering system, such as smart vehicle steering system 100 of FIGS. 2A-2C and 3A-3C, of a motor vehicle, such as automobile 10 of FIG. 1, is generally described at 200 in accordance with aspects of the present disclosure. Some or all of the operations illustrated in FIG. 2 and described in further detail below may be representative of an algorithm that corresponds to non-transitory, processor-executable instructions that are stored, for example, in main or auxiliary or remote memory (e.g., resident memory device 38 and/or remote cloud computing service 24 database of FIG. 1). These instructions may be executed, for example, by an electronic controller, processing unit, dedicated control module, logic circuit, or other module or device or network of controllers/modules/devices (e.g., CPU 36 of FIG. 1 and/or SWCM 136 of FIG. 2A), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 begins at START terminal block 201 of FIG. 2 with memory-stored, processor-executable instructions for initializing a touchscreen configurable steering wheel control protocol for a motor vehicle. This routine may be initialized in real-time, near real-time, continuously, systematically, sporadically, and/or at predefined time intervals, for example, each 10 or 100 milliseconds during operation of the motor vehicle 10. As yet another option, terminal block 201 may initialize responsive to a user command prompt (e.g., via telematics 14 input controls), a resident vehicle controller prompt (e.g., from CPU 36), or a broadcast prompt signal received from a centralized back-office (BO) vehicle services system (e.g., from cloud host service 24). Upon completion of some or all of the control operations presented in FIG. 2, method 200 may advance to END terminal block 217 and temporarily terminate or, optionally, may loop back to terminal block 201 and run in a continuous loop.

Advancing from terminal block 201 to VEHICLE SLEEP process block 203, method 200 may provide memory-stored, process-executable instructions that prompt the SWCM 136 to communicate, for example, with the PCM 52 and any of the other herein-described subsystem control modules to ascertain if/when the vehicle is asleep (e.g., vehicle powertrain off and vehicle electronics off or in low-power mode). When the vehicle is asleep, the SWCM 136 may receive confirmation, e.g., from the PCM 52, body control module (BCM), or other suitable source, that that a wake-up event has occurred (e.g., occupant activates accessory mode); the vehicle is responsively woken up (e.g., vehicle powertrain remains off but vehicle electronics transition to full-power mode). After receiving confirmation of the wakeup command and the waking of the subject host vehicle, method 200 responsively executes VEHICLE WAKE process block 205 whereat the SWCM 136 commands the touchscreen display interface 102 to display a wheel angle indicator (e.g., wheel angle indicator 114A, 114B) in a default orientation at a default location, such as those shown in FIGS. 2A and 3A.

Method 200 transitions from VEHICLE WAKE process block 205 to VEHICLE ON process block 207 responsive to the SWCM 136 receiving confirmation of a key-on command to turn on the subject host vehicle (e.g., driver concurrently depresses brake pedal and ignition button). When the vehicle is being keyed on, the touchscreen display interface 102 may initially display the wheel angle indicator 114A/114B in an initial (first) indicator orientation at an initial (first) indicator location (e.g., FIG. 3A) and a set of soft touch controls 116B in an initial (second) controls orientation at an initial (second) controls location (e.g., FIG. 3A). At this juncture, the vehicle steering system determines a road wheel angle for at least one of the steered vehicle road wheels and concurrently determines an encoder offset to correlate the handwheel's present rotational angle to the road wheel angle. As noted above, an on-vehicle position sensor (e.g., wheel angle sensor 120A, 120B of FIG. 3B) outputs sensor data indicative of a steering angle of one or both front vehicle wheels 126A, 126B. The touchscreen display interface 102 responsively moves the wheel angle indicator 114A, 114B to a new indicator orientation that corresponds to the steering angle of the front vehicle wheel(s) (a non-zero angle value). At the same time, the touchscreen display interface 102 may move the soft touch controls set 116B to a new controls location that reflects the vehicle wheel angle and the new angle indicator orientation.

With continuing reference to FIG. 4, method 200 determines whether or not the vehicle is still on, as indicated at VEHICLE ON decision block 209. If not (Block 209=NO), touchscreen display interface 102 may responsively display the wheel angle indicator 114A, 114B and any attendant soft touch controls 116B in their respective default locations/orientations, and method 200 may advance to END terminal block 217 and temporarily terminate. On the other hand, if the vehicle is still on (Block 209=YES), method 200 may responsively execute HAND MOVEMENT decision block 211 to determine whether or not the driver moved a hand on the handwheel 104. If not (Block 211=NO), method 200 may responsively execute SCREEN CONTROL process block 213 and maintain the set of soft touch controls 116B in its current location/orientation; method 200 may thereafter loop back to decision block 209. Upon determining that one or both user hands of the user have moved on the handwheel (Block 211=YES), method 200 may responsively execute SCREEN CONTROL process block 215 and move the set of soft touch controls 116B to a new location/orientation; method 200 may thereafter loop back to decision block 209.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle having a vehicle body, multiple road wheels attached to the vehicle body, and a vehicle steering system operable to steer a front vehicle wheel of the road wheels, the vehicle steering system including a steering wheel assembly with a touchscreen display interface mounted to a central hub, the method comprising:

receiving, via a vehicle controller of the motor vehicle prior to turning on the motor vehicle, confirmation of a wakeup command to wake the motor vehicle;

displaying, via the touchscreen display interface responsive to the wakeup command, a wheel angle indicator in a default orientation at a default location;

receiving, via the vehicle controller of the motor vehicle, confirmation of a key-on command to turn on the motor vehicle;

displaying, via the touchscreen display interface of the steering wheel assembly, the wheel angle indicator in a first orientation at a first location and a soft touch controls set in a second orientation at a second location;

generating, via a position sensor of the motor vehicle, sensor data indicative of a steering angle of the front vehicle wheel and/or a hand position of a user hand of a user on a handwheel of the steering wheel assembly; and displaying, via the touchscreen display interface, the wheel angle indicator moved to a new first orientation responsive to the sensor data indicating the steering angle of the front vehicle wheel is a non-zero angle value and/or the soft touch controls set moved to a new second location responsive to the sensor data indicating the hand position of the user hand moved to a new hand position on the handwheel of the steering wheel assembly.

2. The method of claim 1, wherein the position sensor includes a plurality of pressure sensors, and wherein the sensor data indicates a first of the pressure sensors detects the hand position of the user hand at a first handwheel angle and a second of the pressure sensors subsequently detects the new hand position of the user hand at a second handwheel angle.

3. The method of claim 2, wherein the second location of the soft touch controls set is radially aligned with the first handwheel angle and the new second location is radially aligned with the second handwheel angle.

4. The method of claim 3, wherein the plurality of pressure sensors includes a networked array of pressure sensors mounted to and spaced equidistant around the handwheel.

5. The method of claim 4, wherein the plurality of pressure sensors includes piezoresistive pressure sensors, capacitive pressure sensors, diffused silicon pressure sensors, piezoelectric pressure sensors, and/or inductive pressure sensors.

6. The method of claim 1, further comprising displaying, via the touchscreen display interface, the soft touch controls set rotating to a new second orientation responsive to the sensor data indicating the hand position of the user hand moved to the new hand position.

7. The method of claim 1, further comprising:

receiving, via the touchscreen display interface, a user selection from the user to add, remove, reposition, and/or resize a soft touch control in the soft touch controls set; and modifying, via the touchscreen display interface, the soft touch controls set based on the user selection received from the user.

8. The method of claim 1, wherein the position sensor includes a wheel angle sensor operatively attached to the front vehicle wheel, and wherein the sensor data indicates the steering angle of the front vehicle wheel is the non-zero angle value relative to a longitudinal forward-driving reference plane of the motor vehicle.

9. The method of claim 8, wherein the wheel angle indicator is rotated the non-zero angle value of the front vehicle wheel relative to a longitudinal zero-angle reference line of the steering wheel assembly to the new first orientation.

10. The method of claim 9, further comprising:
receiving, via a rotational encoder attached to the steering wheel assembly, encoder data indicative of a real-time displacement and turning rate of the handwheel during operation of the motor vehicle; and
displaying, via the touchscreen display interface, the wheel angle indicator rotating coincident with the real-time displacement and turning rate of the handwheel.

11. The method of claim 1, wherein the wheel angle indicator is a vehicle emblem or vehicle name corresponding to a make or model of the motor vehicle, the default location is a center of the touchscreen display interface, and the default orientation is substantially horizontal.

12. The method of claim 1, further comprising displaying, via a lighting element mounted to the handwheel of the steering wheel assembly, a handwheel steering reference point indicative of a current steering direction of the steering wheel assembly.

13. The method of claim 1, wherein the default orientation of the wheel angle indicator is distinct from the first orientation, and the default location of the wheel angle indicator is distinct from the first location.

14. A vehicle steering system for a motor vehicle having a vehicle body and multiple road wheels attached to the vehicle body, the vehicle steering system comprising:
a steering wheel assembly operable to steer a front vehicle wheel of the road wheels, the steering wheel assembly including a central hub and a handwheel attached to the central hub;
a hand position sensor attached to the handwheel and configured to detect a user hand of a user on the handwheel;
a touchscreen display interface mounted to the central hub; and
a system controller programmed to:
receive confirmation of a wakeup command to wake the motor vehicle;
responsive to the wakeup command, command the touchscreen display interface to display a wheel angle indicator in a default orientation at a default location;
receive confirmation of a key-on command to turn on the motor vehicle;
responsive to the motor vehicle being turned on, command the touchscreen display interface to display the wheel angle indicator in a first orientation at a first location and a soft touch controls set in a second orientation at a second location distinct from the first location;
receive, from a wheel angle sensor of the motor vehicle, angle sensor data indicative of a steering angle of the front vehicle wheel;

receive, from the hand position sensor, position sensor data indicative of a hand position of the user hand on the handwheel of the steering wheel assembly; and
command the touchscreen display interface to display:
the wheel angle indicator moved to a new first orientation, distinct from the first orientation, responsive to the angle sensor data indicating the steering angle of the front vehicle wheel is a non-zero angle value, and
the soft touch controls set moved to a new second location, distinct from the second location, responsive to the position sensor data indicating the hand position of the user hand moved to a new hand position on the handwheel of the steering wheel assembly.

15. A motor vehicle, comprising:
a vehicle body;
a plurality of road wheels attached to the vehicle body;
a prime mover attached to the vehicle body and configured to drive one or more of the road wheels to thereby propel the motor vehicle;
a vehicle steering system attached to the vehicle body and configured to steer a front vehicle wheel of the road wheels, the vehicle steering system including a steering wheel assembly with a central hub, a handwheel attached to the central hub, and a touchscreen display interface mounted to the central hub; and
a vehicle controller communicatively connected to the vehicle steering system, the vehicle controller being programmed to:
receive confirmation of a wakeup command to wake the motor vehicle;
responsive to the wakeup command, command the touchscreen display interface to display a wheel angle indicator in a default orientation at a default location;
receive confirmation of a key-on command to turn on the motor vehicle;
responsive to the key-on command, command the touchscreen display interface to display the wheel angle indicator in a first orientation at a first location and a soft touch controls set in a second orientation at a second location;
receive, from a position sensor of the motor vehicle, sensor data indicative of a steering angle of the front vehicle wheel and/or a hand position of a user hand of a user on the handwheel of the steering wheel assembly; and
command the touchscreen display interface to display:
the wheel angle indicator moved to a new first orientation responsive to the sensor data indicating the steering angle of the front vehicle wheel is a non-zero angle value, and/or
the soft touch controls set moved to a new second location responsive to the sensor data indicating the hand position of the user hand moved to a new hand position on the handwheel of the steering wheel assembly.

16. The motor vehicle of claim 15, wherein the position sensor includes a plurality of pressure sensors, and wherein the sensor data indicates a first of the pressure sensors detects the hand position of the user hand at a first handwheel angle and a second of the pressure sensors subsequently detects the new hand position of the user hand at a second handwheel angle.

17. The motor vehicle of claim 16, wherein the second location of the soft touch controls set is radially aligned with the first handwheel angle and the new second location is radially aligned with the second handwheel angle.

18. The motor vehicle of claim 15, wherein the vehicle controller is further programmed to:

receive, from the touchscreen display interface, a user selection from the user to add, remove, reposition, and/or resize a soft touch control in the soft touch controls set; and command the touchscreen display interface to modify the soft touch controls set based on the user selection received from the user.

19. The motor vehicle of claim 15, wherein the position sensor includes a wheel angle sensor operatively attached to the front vehicle wheel, and wherein the sensor data indicates the steering angle of the front vehicle wheel is the non-zero angle value relative to a longitudinal forward-driving reference plane of the motor vehicle.

20. The motor vehicle of claim 19, wherein the wheel angle indicator is rotated the non-zero angle value of the front vehicle wheel relative to a longitudinal zero-angle reference line of the steering wheel assembly to the new first orientation.

\* \* \* \* \*